(12) United States Patent
Jo et al.

(10) Patent No.: US 10,777,860 B2
(45) Date of Patent: Sep. 15, 2020

(54) BATTERY MODULE ASSEMBLY

(71) Applicant: LG Chem, Ltd., Seoul (KR)

(72) Inventors: Woo-Sik Jo, Daejeon (KR); Jin-Moo Nam, Daejeon (KR); Gyu-Jong Bae, Daejeon (KR); Hyun-Seok Shim, Daejeon (KR); Yong-Seok Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 16/077,692

(22) PCT Filed: Sep. 25, 2017

(86) PCT No.: PCT/KR2017/010561
§ 371 (c)(1),
(2) Date: Aug. 13, 2018

(87) PCT Pub. No.: WO2018/070694
PCT Pub. Date: Apr. 19, 2018

(65) Prior Publication Data
US 2019/0044201 A1    Feb. 7, 2019

(30) Foreign Application Priority Data

Oct. 10, 2016    (KR) .................. 10-2016-0130779

(51) Int. Cl.
*H01M 10/613*        (2014.01)
*H01M 10/653*        (2014.01)
(Continued)

(52) U.S. Cl.
CPC ........... *H01M 10/613* (2015.04); *H01M 2/10* (2013.01); *H01M 2/1016* (2013.01);
(Continued)

(58) Field of Classification Search
CPC ............. H01M 10/653; H01M 10/654; H01M 10/6556
See application file for complete search history.

(56) References Cited

U.S. PATENT DOCUMENTS

| | | | |
|---|---|---|---|
| 6,379,837 | B1 | 4/2002 | Takahashi et al. |
| 8,852,772 | B2 | 10/2014 | McDonald |

(Continued)

FOREIGN PATENT DOCUMENTS

| | | |
|---|---|---|
| CN | 106410319 A | 2/2017 |
| CN | 206471410 U | 9/2017 |

(Continued)

OTHER PUBLICATIONS

International Search Report and Written Opinion for Application No. PCT/KR2017/010561, dated Jan. 11, 2018 (w/Engl. translation of search report) (11 pages).

(Continued)

*Primary Examiner* — Ula C Ruddock
*Assistant Examiner* — Thomas H. Parsons
(74) *Attorney, Agent, or Firm* — Morgan, Lewis & Bockius LLP

(57) ABSTRACT

A battery module assembly includes a battery module and a cooling plate attached to the battery module, wherein the battery module has a first paste injection hole for injecting a thermal paste into the battery module and a first paste discharge hole for discharging the thermal paste out of the battery module, and wherein the cooling plate has a second paste injection hole formed at a location corresponding to the first paste injection hole and a second paste discharge hole for allowing the thermal paste discharged out of the battery module through the first paste discharge hole to be discharged out of the battery module assembly.

7 Claims, 6 Drawing Sheets

(51) Int. Cl.
*H01M 10/6556* (2014.01)
*H01M 2/10* (2006.01)
*H01M 10/6554* (2014.01)

(52) U.S. Cl.
CPC ..... *H01M 10/653* (2015.04); *H01M 10/6554* (2015.04); *H01M 10/6556* (2015.04)

(56) References Cited

U.S. PATENT DOCUMENTS

| | | |
|---|---|---|
| 2010/0015512 A1 | 1/2010 | Inoue et al. |
| 2011/0206948 A1 | 8/2011 | Asai et al. |
| 2015/0194642 A1 | 7/2015 | Yamamoto et al. |
| 2016/0197386 A1 | 7/2016 | Moon et al. |
| 2018/0076493 A1 | 3/2018 | Park et al. |

FOREIGN PATENT DOCUMENTS

| | | |
|---|---|---|
| JP | 2000-306564 A | 11/2000 |
| JP | 2008-204990 A | 9/2008 |
| JP | 2011-222214 A | 11/2011 |
| JP | 2012-113875 A | 6/2012 |
| JP | 2012-119156 A | 6/2012 |
| JP | 2012-204129 A | 10/2012 |
| JP | 2013-157599 A | 8/2013 |
| JP | 2014-091463 A | 5/2014 |
| JP | 2014-093241 A | 5/2014 |
| JP | 2018-510463 A | 4/2018 |
| KR | 10-2011-0097666 A | 8/2011 |
| KR | 10-2015-0126132 A | 11/2015 |
| KR | 10-2013-0078519 A | 1/2018 |

OTHER PUBLICATIONS

Notification of Reason for Refusal dated Aug. 26, 2019, issued in corresponding Korean Patent Application No. 10-2016-0130779.

BATTERY MODULE ASSEMBLY

The present application claims priority under 35 U.S.C. § 119 to Korean Patent Application No. 10-2016-0130779 filed on Oct. 10, 2016 in the Republic of Korea, and under 35 U.S.C. § 365 to PCT/KR2017/010561 filed on Sep. 25, 2017, the disclosures of which are incorporated herein by reference.

TECHNICAL FIELD

The present disclosure relates to a battery module assembly, and more particularly, to a battery module assembly designed to simplify an assembling process between a battery module and a cooling plate provided for cooling the battery module and also contribute to the improvement of cooling performance for the battery module.

BACKGROUND

As a secondary battery is applied to more various fields and more developed devices, the capacity demanded required for the secondary battery is getting larger. Also, as the capacity is increasing, the importance of the technology for efficiently cooling the heat generated in the secondary battery is growing.

Referring to FIGS. 1 to 3, the structure of a conventional battery module assembly 1 and the structure of a battery module 2 applied thereto are shown.

First, the structure of the conventional battery module 2 is described with reference to FIG. 1. At least one paste injection hole 2a is formed on a bottom surface of the battery module 2 in order to coat a thermal paste onto an inside of the battery module 2, and at least one paste discharge hole 2b is also formed to check whether the injected paste fills the entire inner space or not.

The conventional battery module 2 configured as above is designed to stably fix a battery cell C and improve thermal conduction by injecting a thermal paste through an injection hole H1 to fill the space between the battery cell C in the battery module 2 and a module case with the thermal paste.

After the process of filling the thermal paste in the battery module 2 is completed, a cooling plate 3 is attached to a bottom surface of the battery module 2. In order to attach the cooling plate 3, a thermal paste is applied to the bottom surface of the battery module 2 again and then the cooling plate 3 is attached thereto.

However, if the thermal paste is applied to the bottom surface of the battery module 2 for the attachment of the cooling plate 3, it is not guaranteed that the thermal paste is uniformly applied between the battery module 2 and the cooling plate 3, and it is also not guaranteed that the thermal paste spreads uniformly when the cooling plate 3 is coupled. Thus, a thermal resistance may increase at the interface between the bottom surface of the battery module 2 and the cooling plate 3.

In addition, if the process of coating a thermal paste to the inside of the battery module 2 and the process of coating a thermal paste to the bottom surface of the battery module 2 for the attachment of the cooling plate 3 are performed separately as described above, the coating process should be performed repeatedly, which is also disadvantageous in terms of productivity.

SUMMARY

The present disclosure is designed to solve the problems of the related art, and therefore the present disclosure is directed to improving the structure of a cooling plate coupled to a battery module so that a process of filling a thermal paste in the battery module and a process of coating a thermal paste to an interface between the cooling plate and the battery module are integrally performed.

However, the technical problem to be solved by the present disclosure is not limited to the above, and other objects not mentioned herein will be understood from the following description by those skilled in the art.

In one aspect of the present disclosure, there is provided a battery module assembly, comprising: a battery module; and a cooling plate attached to the battery module, wherein the battery module has a first paste injection hole for injecting a thermal paste into the battery module and a first paste discharge hole for discharging the thermal paste out of the battery module, and wherein the cooling plate has a second paste injection hole formed at a location corresponding to the first paste injection hole and a second paste discharge hole for allowing the thermal paste discharged out of the battery module through the first paste discharge hole to be discharged out of the battery module assembly.

The battery module may include: a module case; and a cell stack accommodated in the module case.

The thermal paste injected into the battery module may be filled in a first paste channel formed between the cell stack and the module case.

The thermal paste may fix the cell stack and the module case to each other.

The thermal paste discharged out of the battery module through the first paste discharge hole may be filled in a second paste channel formed between the battery module and the cooling plate.

The thermal paste may fix the battery module and the cooling plate to each other.

The cooling plate may have a cooling channel serving as a passage through which a cooling fluid flows.

According to an embodiment of the present disclosure, the productivity of the battery module assembly may be improved because a process of filling a thermal paste in the battery module and a process of coating a thermal paste to the interface between the cooling plate and the battery module may be integrally performed.

According to another embodiment of the present disclosure, since the thermal paste is distributed uniformly at the interface between the cooling plate and the battery module, the thermal resistance at the interface may be minimized, thereby improving the cooling performance.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
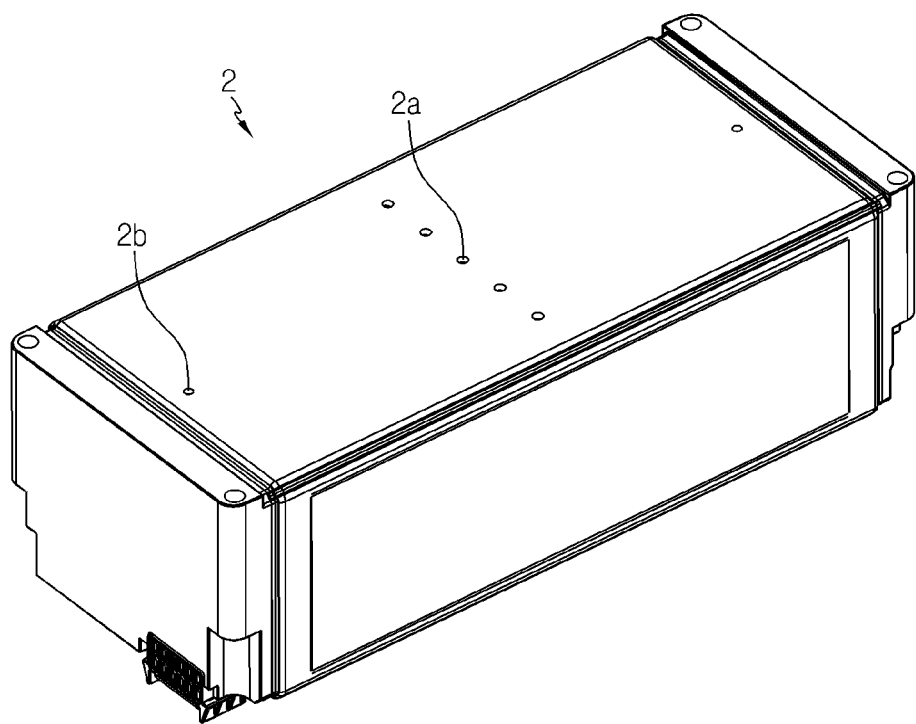
FIG. 1 is a diagram showing a conventional battery module.
Figure 2:
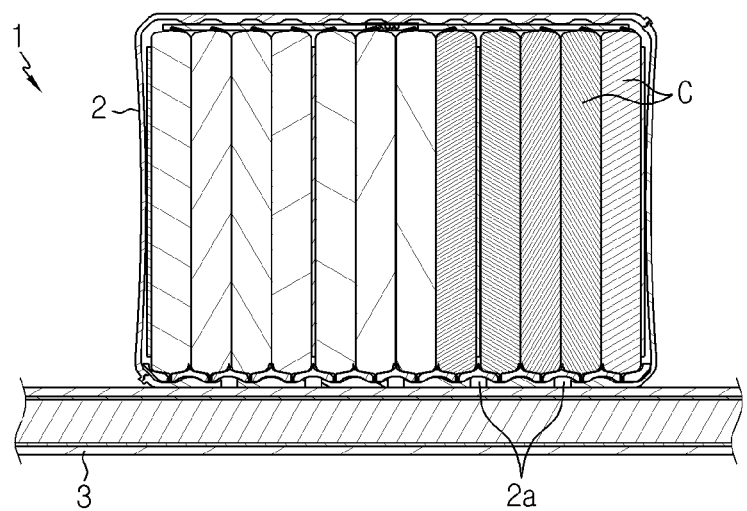
FIGS. 2 and 3 are diagrams showing a section of a conventional battery module assembly.
Figure 3:
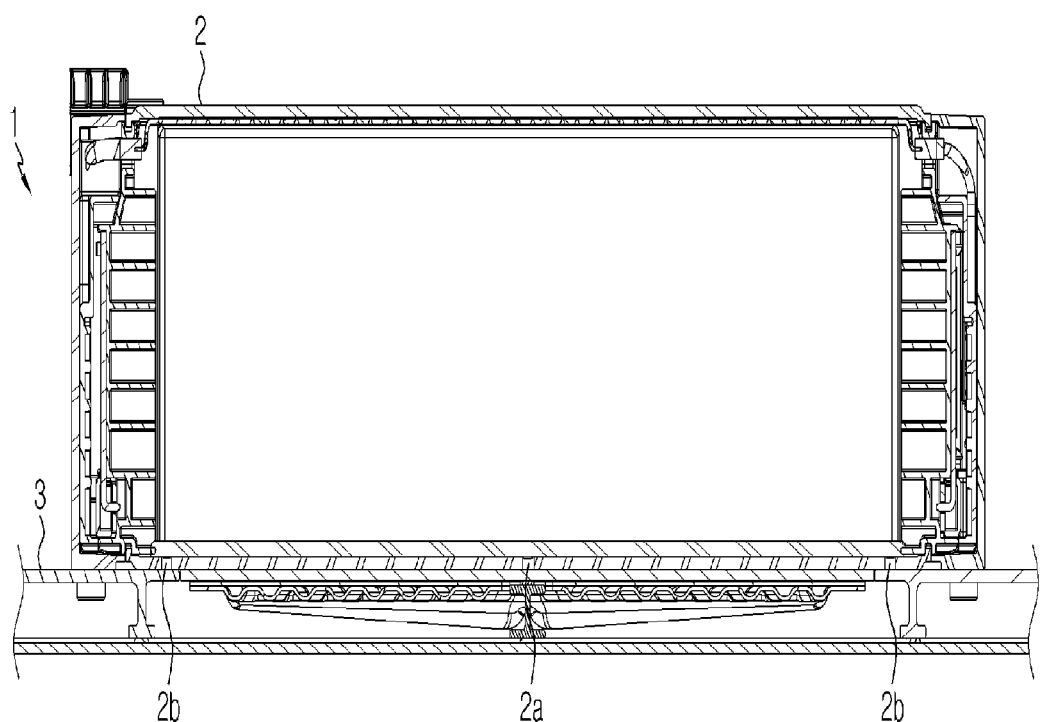
Figure 4:
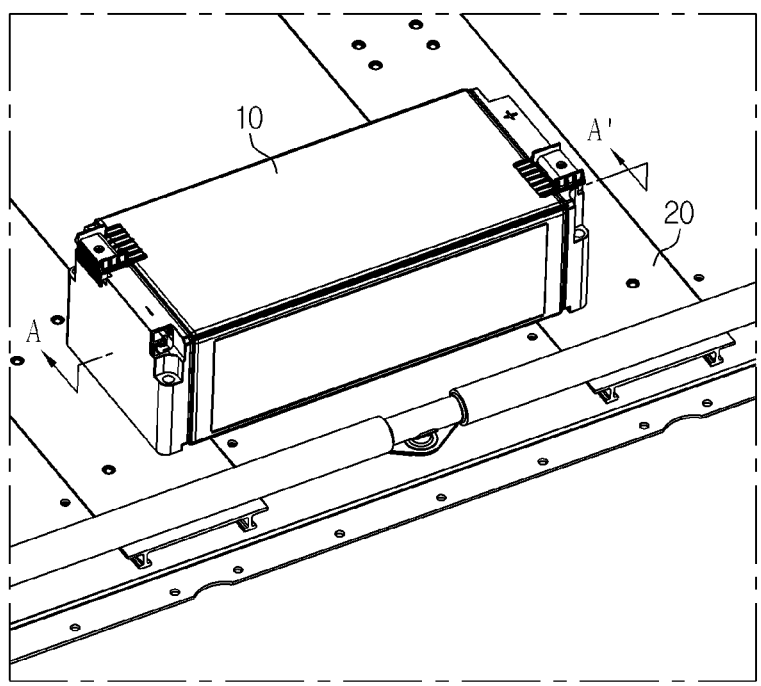
FIG. 4 is a diagram showing a battery module assembly according to an embodiment of the present disclosure.
Figure 5:
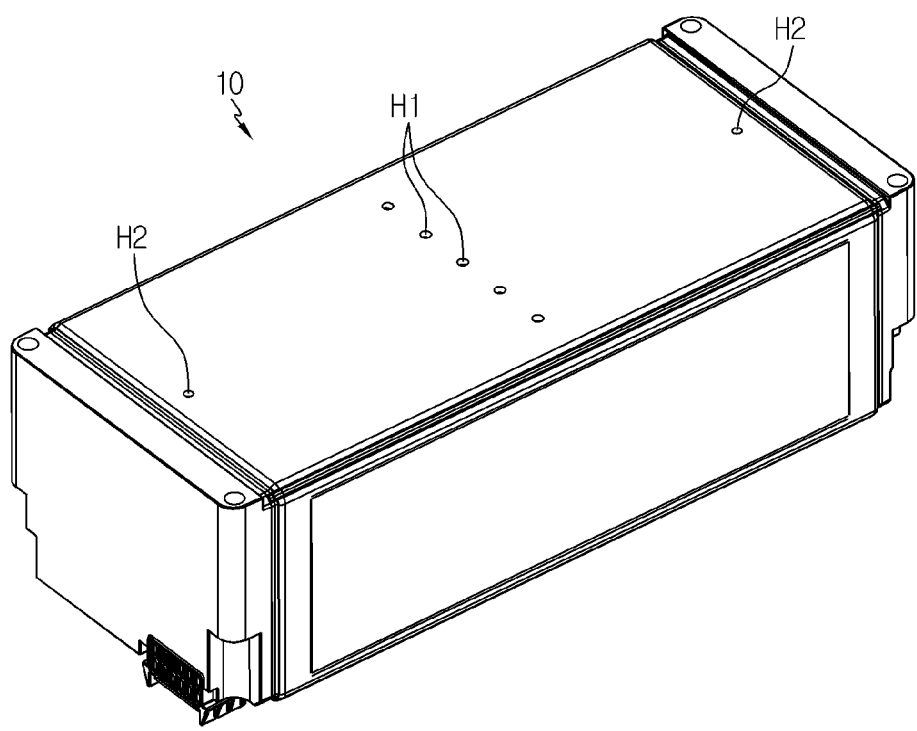
FIG. 5 is a diagram showing a bottom surface of a battery module applied to the battery module assembly according to an embodiment of the present disclosure.
Figure 6:
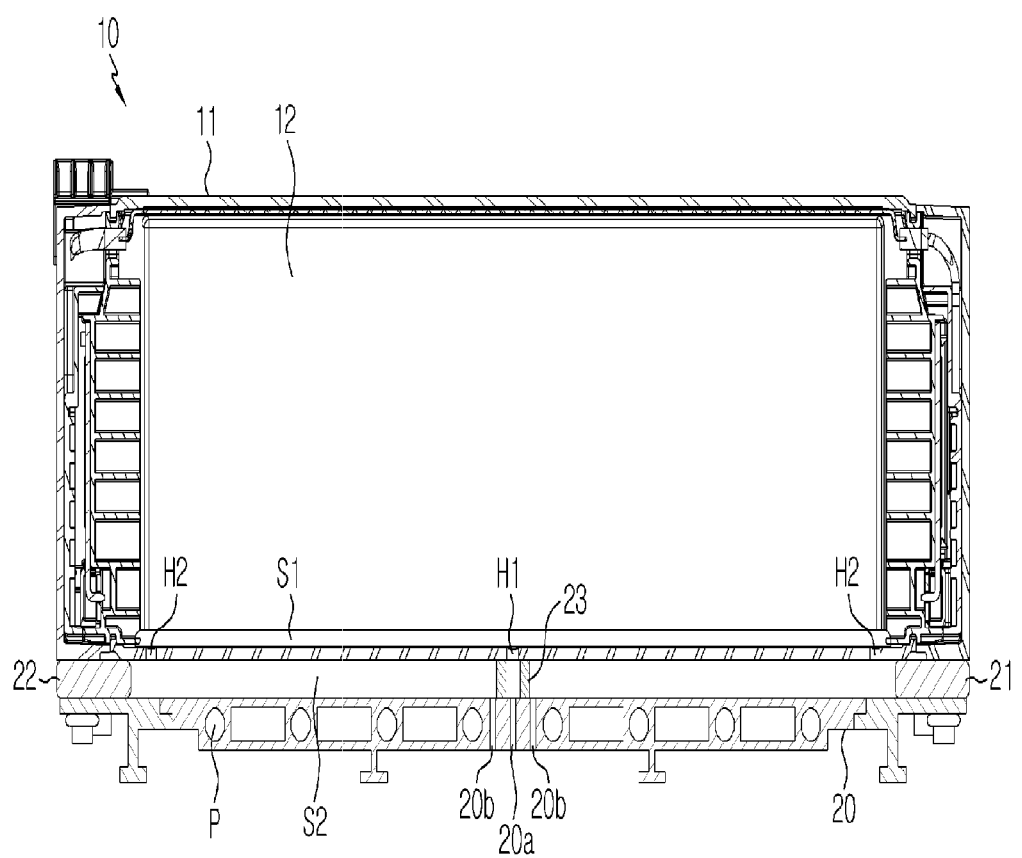
FIG. 6 is a cross-sectioned view showing the battery module assembly according to an embodiment of the present disclosure.

With reference to FIGS. 4 to 6, a battery module assembly according to an embodiment of the present disclosure will be described.

FIG. 4 is a diagram showing a battery module assembly according to an embodiment of the present disclosure, and FIG. 5 is a diagram showing a bottom surface of a battery module applied to the battery module assembly according to an embodiment of the present disclosure. Also, FIG. 6 is a cross-sectioned view showing the battery module assembly according to an embodiment of the present disclosure.

Referring to FIGS. 4 to 6, a battery module assembly according to an embodiment of the present disclosure includes a battery module 10 and a cooling plate 20.

The battery module 10 is configured so that a cell stack 12 including a plurality of battery cells is accommodated in a module case 11. The cell stack 12 employed at the battery module 10 may be configured so that a plurality of battery cells are stacked adjacent to each other. In addition, different from the above, the cell stack 12 may be configured so that cells respectively accommodated in cartridges are stacked, or two or more battery cells are accommodated in a single cartridge and then such cartridges are stacked one another.

In other words, the cell stack 12 of the present disclosure may be configured in any way as long as several battery cells serving as a basic unit of a secondary battery can be included.

Meanwhile, the battery module 10 has at least one first paste injection hole H1 and at least one first paste discharge hole H2 formed in a bottom surface thereof.

The first paste injection hole H1 is formed in the bottom surface of the module case 11 to serve as a passage through which a thermal paste may be introduced into battery module 10. As shown in FIG. 5, a plurality of first paste injection holes H1 may be formed in the bottom surface of the module case 11 along a width direction of the bottom surface. However, the location and number of the first paste injection holes H1 are not limited thereto, and the location and number of the first paste injection holes H1 depicted in FIG. 5 are just an example.

The first paste discharge hole H2 is formed in the bottom surface of the module case 11 to serve as a passage through which the thermal paste may be discharged out of the battery module 10. As shown in FIG. 5, one first paste discharge hole H2 may be formed in each of both ends of the bottom surface of the module case 11 in a length direction of the bottom surface. However, the location and number of the first paste discharge holes H2 are not limited thereto, and the location and number of the first paste discharge holes H2 depicted in FIG. 5 are just an example.

The thermal paste used in the present disclosure is a paste having thermal conduction and adhesion. The thermal paste is injected into the battery module through the first paste injection hole H1 to fill a first paste channel S1 formed between the cell stack 12 and the cell case 11 and then is discharged out of the battery module 10 through the first paste discharge hole H2.

The thermal paste filled in the first paste channel S1 as described above fixes the cell case 11 and the cell stack 12 to each other and allows easy transfer of the heat generated at the cell stack 12 toward the cell case 11.

The cooling plate 20 is attached to the bottom surface of the battery module 10 and functions to cool the battery module 10.

The cooling plate 20 has a second paste injection hole 20*a* formed at a location corresponding to the first paste injection hole H1 formed in the battery module 10 and a second paste discharge hole 20*b* formed at a location corresponding to the first paste discharge hole H2.

The second paste injection hole 20*a* serves as a passage for injecting a thermal paste from the outside of the battery module assembly. In addition, the second paste discharge hole 20*b* serves as a passage for allowing the thermal paste discharged out of the battery module 10 through the first paste discharge hole H2 to be discharged out of the battery module assembly.

Meanwhile, the cooling plate 20 includes barriers 21, 22 and a connection tube 23 serving as a spacer so that a space to be filled with the thermal paste is formed between the bottom surface of the battery module 10 and the cooling plate 20, namely so that the cooling plate 20 is spaced apart from the bottom surface of the battery module 10 by a predetermined distance.

The barriers 21, 22 are provided at both ends of the cooling plate 20 in the length direction, and a space is formed between the battery module 10 and the cooling plate 20 as much as the thickness of the barriers 21, 22. This space corresponds to a space serving as a second paste channel S2 that is the space to be filled with the thermal paste discharged through the first paste discharge hole H2 of the battery module 10.

The thermal paste filled in the second paste channel S2 plays a role of fixing the battery module 10 and the cooling plate 20 to each other and also a role of effectively transferring the heat generated at the battery module 10 toward the cooling plate 20.

The connection tube 23 is provided at a location corresponding to the first paste injection hole H1 and the second paste injection hole 20*a* and has a length corresponding to the thickness of the barriers 21, 22. The connection tube 23 serves as a spacer for forming a space between the battery module 10 and the cooling plate 20 and also serves as a passage for connecting the second paste injection hole 20*a* and the first paste injection hole H1.

In other words, the thermal paste injected from the outside of the battery module assembly through the second paste injection hole 20*a* is introduced into the battery module 10 through the connection tube 23 and the first paste injection hole H1.

The thermal paste introduced into the battery module 10 as described above fills the first paste channel S1 formed between the cell stack 12 and the cell case 11. If a thermal paste is introduced from the outside after the first paste channel S1 is fully filled, the thermal paste is discharged out of the battery module 10 through the first paste discharge hole H2 to fill the second paste channel S2 formed between the battery module 10 and the cooling plate 20.

In addition, if a thermal paste is further introduced from the outside after the second paste channel S2 is fully filled, the thermal paste is discharged out of the battery module assembly through the second paste discharge hole 20b.

After it is initiated to inject the thermal paste through the second paste injection hole 20a, the time when it is initiated to discharge the thermal paste through the second paste discharge hole 20b corresponds to the time when the thermal paste is completely filled in the first paste channel S1 and the second paste channel S2.

In the battery module assembly configured as above according to an embodiment of the present disclosure, the thermal paste filling process for the battery module 10 and the thermal paste coating process for the interface between the cooling plate 20 and the battery module 10 may be performed integrally, thereby improving the productivity of the battery module assembly. In addition, the battery module assembly according to an embodiment of the present disclosure may minimize thermal resistance and thus improve cooling performance since the thermal paste present at the interface of the cooling plate 20 and the battery module 10 is distributed uniformly.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module assembly, comprising:
   a battery module; and
   a cooling plate attached to the battery module,
   wherein the battery module has a first paste injection hole for injecting a thermal paste into the battery module and a first paste discharge hole for discharging the thermal paste out of the battery module, and
   wherein the cooling plate has a second paste injection hole formed at a location corresponding to the first paste injection hole and a second paste discharge hole for allowing the thermal paste discharged out of the battery module through the first paste discharge hole to be discharged out of the battery module assembly.

2. The battery module assembly according to claim 1, wherein the battery module includes:
   a module case; and
   a cell stack accommodated in the module case.

3. The battery module assembly according to claim 2, wherein the thermal paste injected into the battery module is filled in a first paste channel formed between the cell stack and the module case.

4. The battery module assembly according to claim 3, wherein the thermal paste fixes the cell stack and the module case to each other.

5. The battery module assembly according to claim 1, wherein the thermal paste discharged out of the battery module through the first paste discharge hole is filled in a second paste channel formed between the battery module and the cooling plate.

6. The battery module assembly according to claim 5, wherein the thermal paste fixes the battery module and the cooling plate to each other.

7. The battery module assembly according to claim 1, wherein the cooling plate has a cooling channel serving as a passage through which a cooling fluid flows.

* * * * *